(12) United States Patent
Wang et al.

(10) Patent No.: US 10,548,812 B2
(45) Date of Patent: Feb. 4, 2020

(54) DRUG DECOCTING CONTAINER

(71) Applicants: Aiying Wang, Yinchuan (CN); Shuqing Gao, Tianjin (CN); Mei Leng, Sichuan Province (CN)

(72) Inventors: Aiying Wang, Yinchuan (CN); Shuqing Gao, Tianjin (CN); Mei Leng, Sichuan Province (CN)

( * ) Notice: Subject to any disclaimer, the term of this patent is extended or adjusted under 35 U.S.C. 154(b) by 41 days.

(21) Appl. No.: 15/533,789

(22) PCT Filed: Sep. 18, 2016

(86) PCT No.: PCT/CN2016/099205
§ 371 (c)(1),
(2) Date: Jun. 7, 2017

(87) PCT Pub. No.: WO2017/050187
PCT Pub. Date: Mar. 30, 2017

(65) Prior Publication Data
US 2017/0326032 A1  Nov. 16, 2017

(30) Foreign Application Priority Data
Sep. 22, 2015  (CN) .......................... 2015 1 0605749

(51) Int. Cl.
*A47J 31/00* (2006.01)
*B65D 85/804* (2006.01)
(Continued)

(52) U.S. Cl.
CPC  *A61J 3/00* (2013.01); *A23F 3/16* (2013.01); *B01D 11/0215* (2013.01); *A47J 31/18* (2013.01); *B65D 85/8043* (2013.01)

(58) Field of Classification Search
CPC ...... A61J 3/00; B01D 11/0215; B01D 11/043; A47J 31/002; A47J 31/18; A47J 31/22;
(Continued)

(56) References Cited

U.S. PATENT DOCUMENTS 1,745,291 A * 1/1930 Bleil .................. C11B 1/10
366/290
2,522,102 A * 9/1950 Dold ................. A47J 31/06
366/165.1
(Continued)

FOREIGN PATENT DOCUMENTS

CN      2437600 Y      7/2001
CN      2467103 Y      12/2001
(Continued)

OTHER PUBLICATIONS

SIPO Search Report.
ISR for PCT/CN2016/099205.

*Primary Examiner* — Gideon R Weinerth
(74) *Attorney, Agent, or Firm* — AKC Patents, LLC; Aliki K. Collins

(57) ABSTRACT

A drug decocting container comprises a cover body (1), an inner-layer container, and an outer-layer container. The inner-layer container is em-bedded in the inner part of the outer-layer container, the strength of the outer-layer container is larger than that of the inner-layer container, and the outer-layer container supports the inner-layer container and controls deformation of the inner-layer container. The cover body (1) is connected with the inner-layer container in a sealing way to form a sealed cavity, and a liquid inlet and a liquid outlet are provided on the sealed cavity. An inner pipe (3) is supported by a high-strength outer pipe (2) in the drug decocting container, such that the wall thickness of the inner pipe (3) can be thin, thereby reducing costs of the inner pipe (3), providing a condition for disposable use of the inner pipe (3), and preventing drugs from influencing each other by residues in the inner pipe (3) so as to affect the quality of a beverage while decocting different drugs. Decoction pieces are separated by multi-stage baffle plates (4), thereby (Continued)

reducing pressure of the decoction pieces on a filter piece (5), and increasing the flowing speed of extract liquor.

10 Claims, 5 Drawing Sheets

(51) Int. Cl.

| | | |
|---|---|---|
| *A23F 5/26* | (2006.01) | |
| *A61J 3/00* | (2006.01) | |
| *A23F 3/16* | (2006.01) | |
| *B01D 11/02* | (2006.01) | |
| *A47J 31/18* | (2006.01) | |

(58) Field of Classification Search
CPC ........ A47J 31/44; A47J 31/06; A47J 31/0605; A47J 31/0615; A47J 31/16; A47J 31/446; A47J 31/007; A23F 3/16; B65D 85/8043; B01F 11/0057
USPC ............. 220/62.11; 99/315, 317, 276–277.2, 99/289 R, 323, 295, 279, 302 R; 366/339, 336, 340; 426/77, 78, 433
See application file for complete search history.

(56) References Cited

U.S. PATENT DOCUMENTS

| | | | | |
|---|---|---|---|---|
| 2,615,385 | A * | 10/1952 | Smail | A47J 31/0615 99/305 |
| 2,911,902 | A * | 11/1959 | Mueller | A47J 31/007 210/239 |
| 2,936,695 | A * | 5/1960 | Donot | B65D 85/8043 99/295 |
| 2,997,940 | A * | 8/1961 | Pecoraro | A47J 31/005 99/315 |
| 3,045,984 | A * | 7/1962 | Cochran | B01F 5/0682 138/38 |
| 3,199,682 | A * | 8/1965 | Scholtz | B65D 85/8043 210/479 |
| 3,223,388 | A * | 12/1965 | Knox | B01F 5/0609 366/339 |
| 3,635,444 | A * | 1/1972 | Potter | B01F 5/0615 366/339 |
| 3,707,905 | A * | 1/1973 | Schwertfeger | A47J 31/408 99/289 R |
| 3,751,009 | A * | 8/1973 | Archer | B01F 5/0619 366/337 |
| 3,826,740 | A * | 7/1974 | Jewett | B01J 19/10 210/521 |
| 4,053,141 | A * | 10/1977 | Gussefeld | B01F 5/0656 366/339 |
| 4,111,402 | A * | 9/1978 | Barbini | B01F 3/10 138/38 |
| 4,183,682 | A * | 1/1980 | Lieffers | B01F 5/0617 366/339 |
| 4,284,105 | A * | 8/1981 | Moked | B01F 5/0614 138/42 |
| 4,466,741 | A * | 8/1984 | Kojima | B01F 5/0615 138/37 |
| 5,178,461 | A * | 1/1993 | Taniguchi | B01F 11/0057 366/307 |
| 5,277,494 | A * | 1/1994 | Lehrke | B01F 5/0656 366/339 |
| 5,326,164 | A * | 7/1994 | Logan | B01F 11/025 366/127 |
| 5,390,587 | A * | 2/1995 | Wu | E03C 1/046 210/449 |
| 5,678,472 | A * | 10/1997 | Millman | A47G 19/14 99/279 |
| 6,658,989 | B2 * | 12/2003 | Sweeney | A47J 31/0642 99/306 |
| 6,832,542 | B2 * | 12/2004 | Hu | A47J 31/0668 99/295 |
| 7,565,861 | B2 * | 7/2009 | Blanc | A47J 31/002 426/433 |
| 8,808,777 | B2 * | 8/2014 | Kamerbeek | B65D 85/8043 426/431 |
| 8,821,953 | B2 * | 9/2014 | Wen | A47J 31/46 426/425 |
| 9,066,619 | B2 * | 6/2015 | Wen | A47J 31/18 |
| 9,232,871 | B2 * | 1/2016 | Rivera | A47J 31/0689 |
| 10,051,989 | B2 * | 8/2018 | Nakao | B65D 85/8043 |
| 10,143,330 | B2 * | 12/2018 | Digiuni | A47J 31/3676 |
| 2003/0209151 | A1 * | 11/2003 | Mordini | A47J 31/06 99/323 |
| 2005/0270900 | A1 * | 12/2005 | Shvartsman | B01F 3/0819 366/174.1 |
| 2011/0305104 | A1 * | 12/2011 | McGuire | B01F 5/0619 366/337 |
| 2013/0287908 | A1 * | 10/2013 | Wen | A47J 31/18 426/237 |
| 2016/0157660 | A1 * | 6/2016 | Rivera | A47J 31/0689 99/323 |
| 2017/0326032 | A1 * | 11/2017 | Wang | B01D 11/0215 |

FOREIGN PATENT DOCUMENTS

| | | |
|---|---|---|
| CN | 1515339 A | 7/2004 |
| CN | 2728481 Y | 9/2005 |
| CN | 201091688 Y | 7/2008 |
| CN | 201870962 U | 6/2011 |
| CN | 202409508 U | 9/2012 |
| CN | 203029632 U | 7/2013 |
| CN | 203694953 U | 7/2014 |
| CN | 203736547 U | 7/2014 |
| CN | 203915486 U | 11/2014 |
| CN | 204395501 U | 6/2015 |
| CN | 105125407 A | 12/2015 |
| CN | 204951635 U | 1/2016 |
| JP | 2009202904 A | 9/2009 |

* cited by examiner

DRUG DECOCTING CONTAINER

FIELD OF THE INVENTION

The present invention relates to pharmaceutical preparations and beverage preparation equipment, and in particular to a drug decocting container for assorted use with a drug decocting machine.

BACKGROUND OF THE INVENTION

Decoction is an important means of processing traditional Chinese medicine. The exiting traditional Chinese medicine decocting machines only repeat the traditional drug decocting procedures, such that the operations are complex, the drug decocting amount is large, the time consumed in the drug decocting process is too long, the purpose of fast drug decocting cannot be satisfied, and the price is high, thereby being not conducive to the popularization of the traditional Chinese medicine. How to reduce the time consumption of the drug decocting and improve the decocting rate of effective ingredients of the traditional Chinese medicine has been a technical problem that those skilled in the art would like to solve all the time.

SUMMARY OF THE INVENTION

The objective of the present invention is to provide a drug decocting container which is novel and unique in structure and convenient to use and can effectively improve the drug decocting efficiency and the effective ingredients of decoction. The specific technical solution is as follows:

A drug decocting container includes a cover body, an inner-layer container and an outer-layer container, and the inner-layer container is embedded in the outer-layer container; the strength of the outer-layer container is larger than that of the inner-layer container for supporting the inner-layer container and controlling the deformation of the inner-layer container; the cover body is hermetically connected with the inner-layer container to form a sealed cavity; and the sealed cavity is provided with a liquid inlet and a liquid outlet.

Further, the liquid inlet or the liquid outlet is formed in the cover body, and correspondingly, the liquid inlet and the liquid outlet are formed in one end of the inner-layer container away from the liquid inlet or the liquid outlet.

Further, the inner-layer container is tubular; and the inner cavity of the outer-layer container is in the shape of a cylinder matched with the inner-layer container.

Further, the wall thickness of the inner-layer container is in a range of 0.1-5 mm.

Further, the inner-layer container is made of a polypropylene (PP) material.

Further, the outer-layer container is tubular and is made of a stainless steel material, and the wall thickness is 5-30 mm.

Further, a filter piece is arranged at the liquid outlet in the inner-layer container.

Further, a baffle is arranged in the inner-layer container, and the baffle is composed of multiple layers of separation pieces and a supporting rod; and the separation pieces are vertical to the axis of the supporting rod.

Further, the layers of baffles of the layered baffle are connected by the supporting rod and are uniformly distributed along the circumferential direction of the supporting rod.

The present invention further provides a drug decocting machine, and the drug decocting container of the drug decocting machine is one of the above-mentioned drug decocting containers; and a counterbalance valve for maintaining the liquid outlet pressure is arranged in a liquid outlet pipeline of the drug decocting container.

According to the drug decocting container provided by the present invention, an inner pipe is supported by a high-strength outer pipe, such that the wall thickness of the inner pipe can be thinned; and the cost of the inner pipe is reduced, and a condition is provided for the disposable use of the inner pipe, thereby preventing drugs from influencing each other by residues in the inner pipe to affect the quality of a beverage, when different drugs are decocted. Decoction pieces are separated by the multistage baffles, thereby reducing the pressure of the decoction pieces on the filter piece and improving the flow speed of the extract.

Reference signs: 1. cover body; 2. outer pipe; 3. inner pipe; 4. baffle; 4-1. supporting rod; 4-2. separation piece; 4-2.1. through area; 4-2.2. isolated area; 5. filter piece.

DETAILED DESCRIPTION OF THE EMBODIMENTS

The present invention will be described more fully below by way of embodiments. The present invention can be embodied in many different forms and should not be construed as being limited to the exemplary embodiments described herein.

For easy illustration, spatial relative terms such as "up", "down", "left", "right" and the like can be used herein to describe the relationship of one element or feature shown in the figures with respect to another element or feature. It should be understood that, in addition to the orientations shown in the figures, the spatial terms are intended to include different orientations of the device in use or operation. For example, if the device in the figure is inverted, the elements described as being located "below" other elements or features will be located "above" the other elements or features. Thus, the exemplary term "below" can include both upper and lower orientations. The device can be located in other ways (rotated for 90 degrees or located in other orientations), and the relative description of the space used herein can be explained accordingly.

Figure 1:
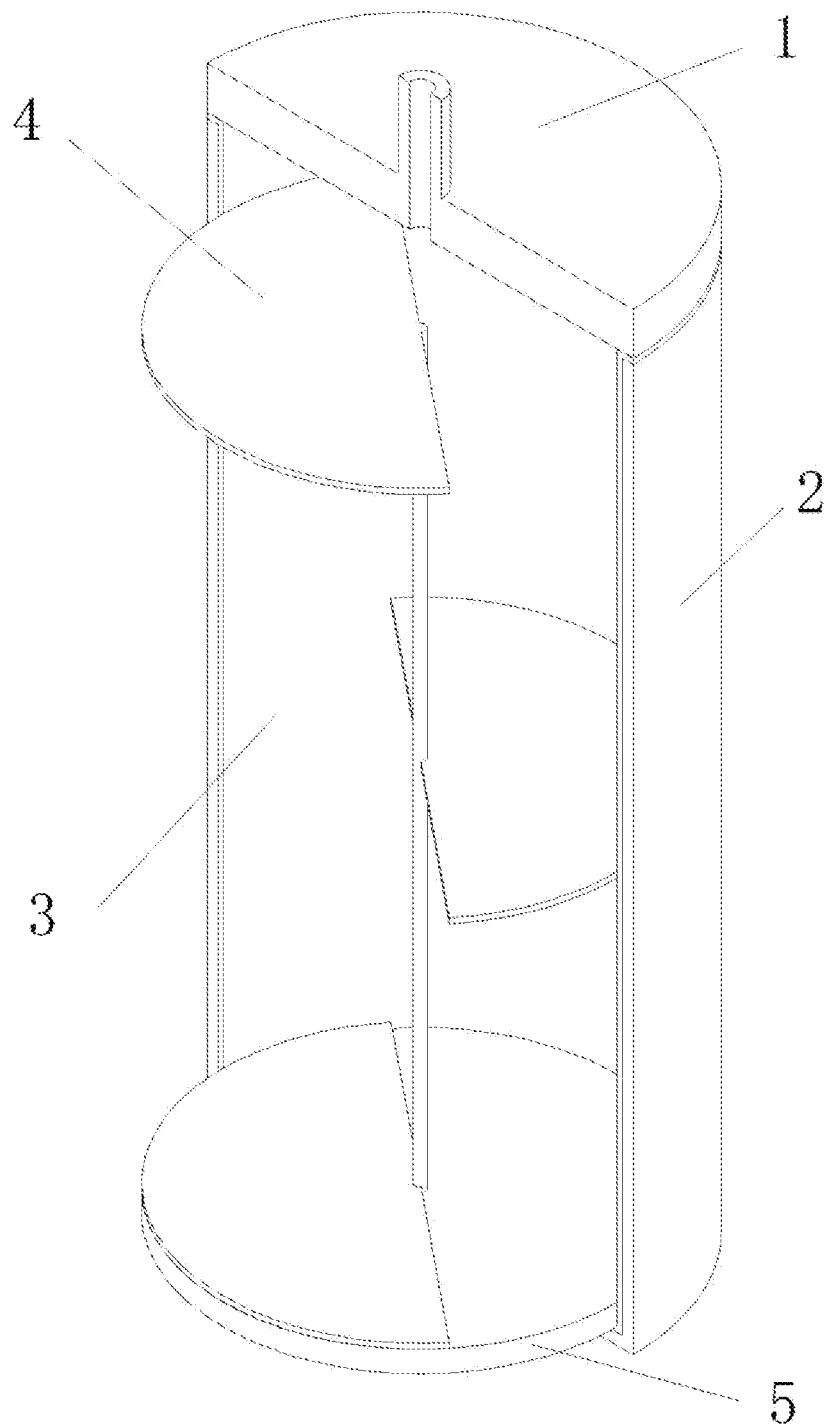
FIG. 1 is a structural schematic diagram of a drug decocting container of the present invention.
Figure 2:
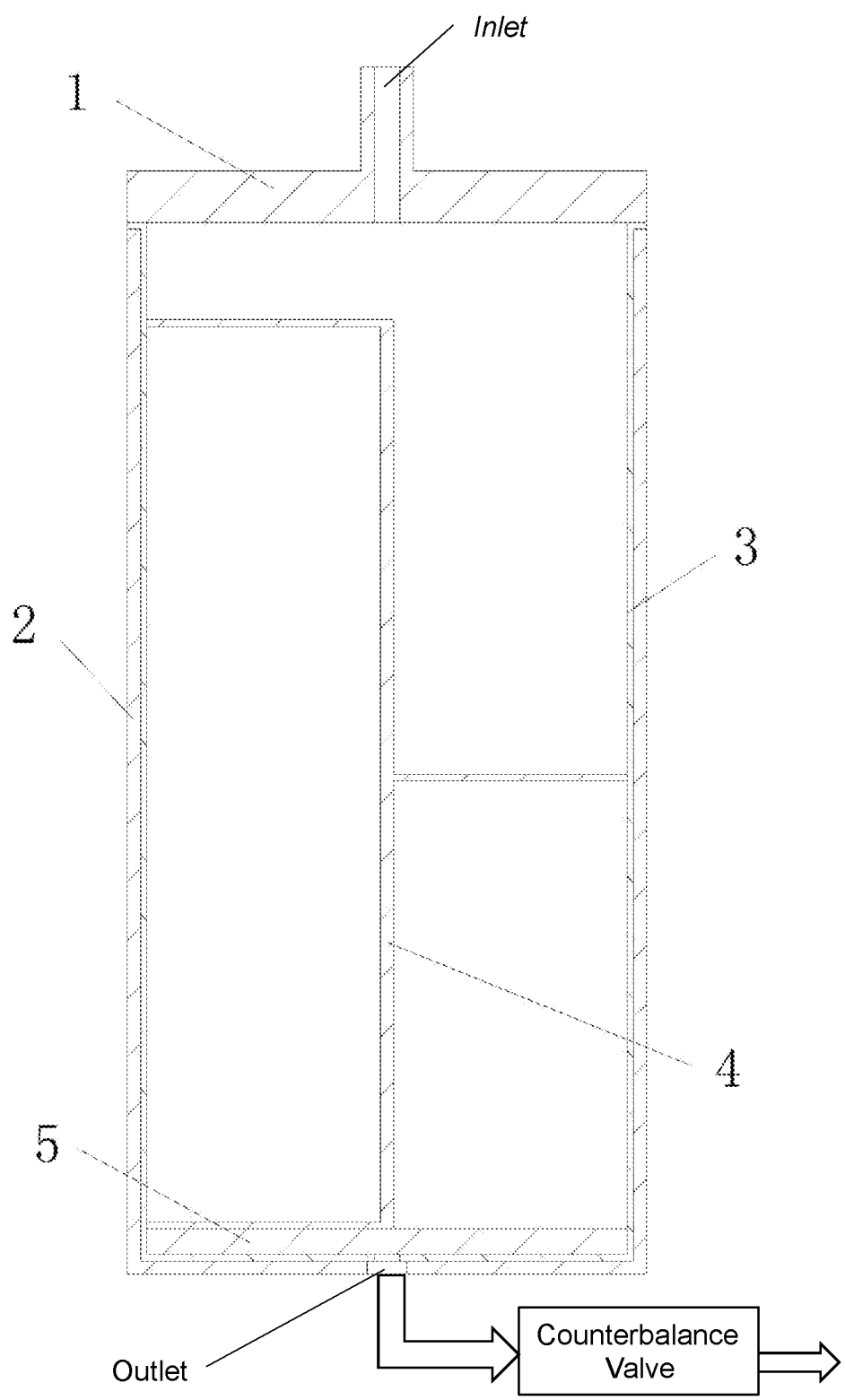
FIG. 2 is a semi-section view of the drug decocting container.

As shown in FIG. 1 and FIG. 2, the drug decocting container in the embodiment includes a cover body 1, an outer pipe 2, an inner pipe 3 and a filter piece 5; the inner pipe 3 is placed in the outer pipe 2, an outer wall of the inner pipe 3 can be close to an inner wall of the outer pipe 2, and a small gap can also be reserved; the inner pipe 3 is provided with an outward upper edge; and the cover body 1 is hermetically connected with the inner pipe 3, and the seal is generally realized in such manners as hydraulic pressing, screwing or clamping, and the like. A gasket can be arranged between an upper surface of the upper edge of the inner pipe 3 and a lower surface of the cover body 1 to improve the sealing effect; and of course, a gasket can also be arranged between the lower surface of the upper edge of the inner pipe 3 and an upper end face of the outer pipe 2 to improve the sealing effect.

The cover body 1, the inner pipe 3 and the outer pipe 2 are pressed and sealed by a pressure, so that ingoing water can only flow in the inner pipe 3 and will not enter the outer pipe 2. The liquid medicine can only flow out from a liquid outlet in a lower end at last after being filtered by the filter piece 5 of the inner pipe. A liquid outlet can also be set to be tubular and to stretch out from a bottom hole of the outer pipe 2 so as to be connected with a liquid outlet pipeline conveniently.

A decoction piece for preparing medicament is placed in the inner pipe 3; and medicinal materials or other raw materials, such as tea, chrysanthemum and the like, can also be placed for preparing a beverage.

During specific implementation, according to the volume of the drug decocting container and the characters of the raw materials, the thickness of the inner wall of the inner pipe 3 can be set as 0.1 mm, 0.5 mm or 5 mm; and a baffle 4 is arranged in the inner pipe 3.

Figure 3:
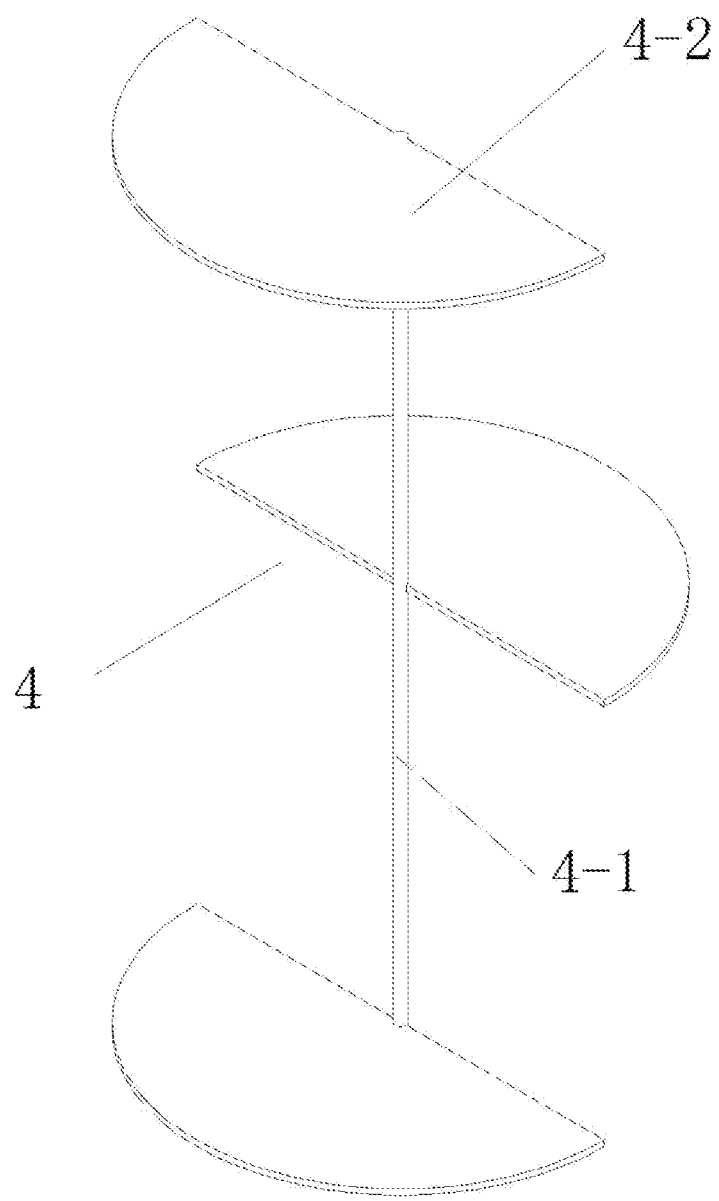
FIG. 3 is a structural schematic diagram of a baffle.

As shown in FIG. 3, the baffle 4 is composed of three separation pieces 4-2 and a supporting rod 4-1. Of course, the number of the separation pieces 4-2 can also be 4-18 or more.

The separation pieces 4-2 are sectorial planes, are fixed to the supporting rod 4-1, can be uniformly distributed along the axial direction of the supporting rod 4-1 and can also be not uniformly distributed. Similarly, the separation pieces 4-2 can be uniformly distributed along the circumferential direction of the supporting rod 4-1 and can also be not uniformly distributed. The angle of the sector does not exceed 180 degrees in general, and the conventional angle is 45 degrees, 60 degrees, 90 degrees and 120 degrees. The separation pieces 4-2 can be arranged to be vertical to the axis of the supporting rod 4-1 and can also be arranged to form inclined angles of 80° to 100° with the axis of the supporting rod 4-1; that is, if the axis of the supporting rod 4-1 is a vertical direction, the separation pieces 4-2 can be horizontally arranged and can also be obliquely arranged on the circle center or arc surface direction; and the sectorial planes can also be overturned, and the included angle between a straight line formed by the two ends of the arc surface and the vertical direction is 80° to 100°.

Figure 4:
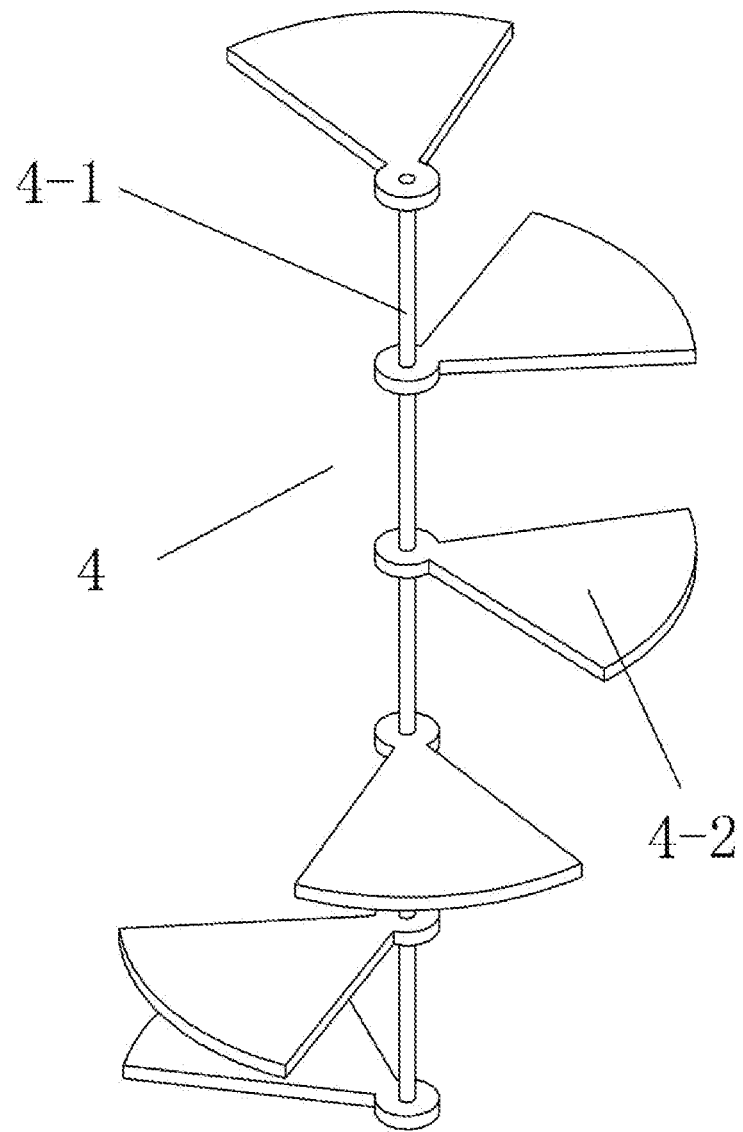
FIG. 4 is a structural schematic diagram of the baffle.
Figure 5:
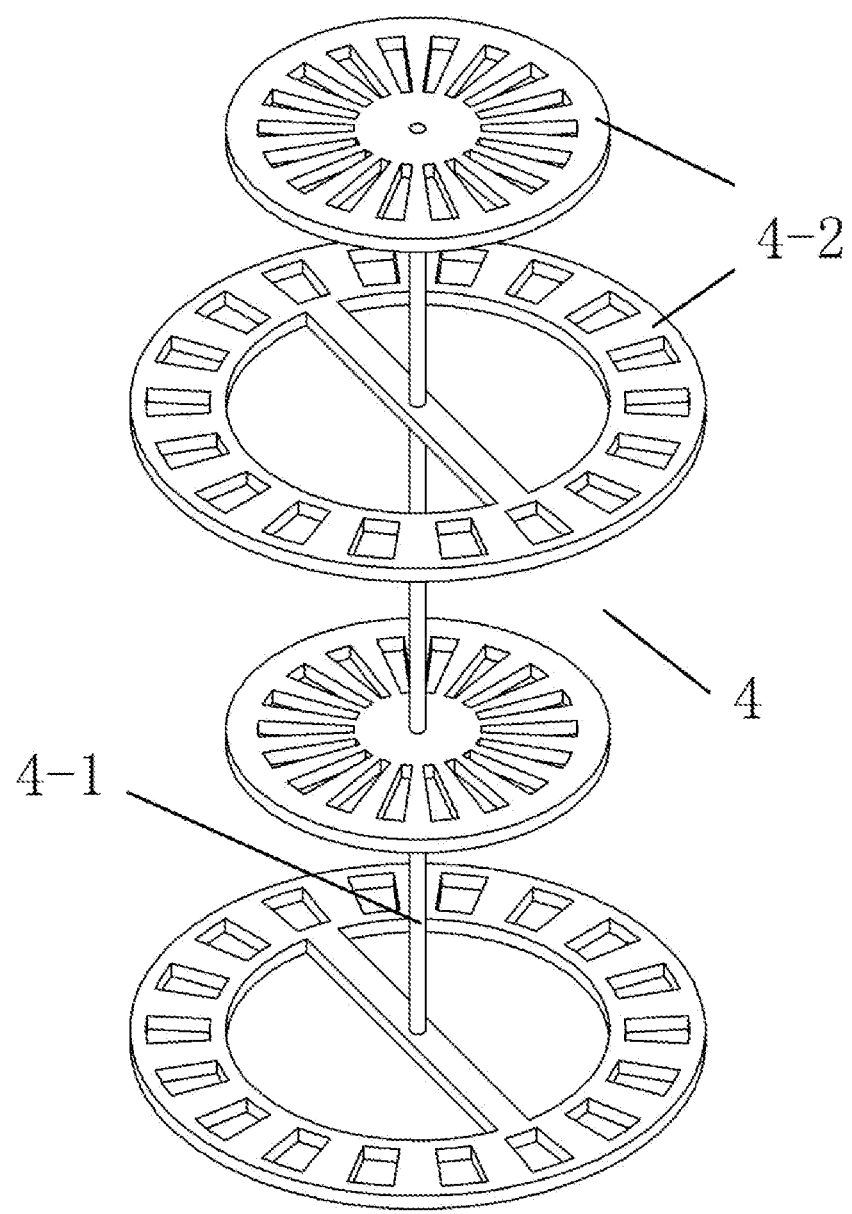
FIG. 5 is a structural schematic diagram of the baffle.

The separation pieces 4-2 can also be set to be disk-shaped matched with the inner cavity of the inner pipe 3, through holes communicating with one another up and down are formed in the disk-shaped separation pieces and the raw materials leak to the lower layer through the through holes. An area ratio of a through area 4-2.1 to an isolated area 4-2.2 is 1:1 to 3:1. During specific implementation, the separation pieces 4-2 can also be matrix plates or grid plates, or the forms as shown in FIG. 4 and FIG. 5.

The separation pieces 4-2 separate the raw materials by sealed blocking areas and provide support; and the pressure of the raw materials in the inner pipe 3 on the filter piece 5 can be reduced by the support of the baffle 4 to avoid the blockage of the filter piece. Meanwhile, the raw materials can leak to the lower layer from the through area, which is conducive to the uniform distribution of the raw materials in the inner pipe 3. If a pulse pressure is applied to water at work, in a change process of pressure increase and decrease, the separation pieces 4-2 can also play a stirring function, the separation pieces 4-2 will generate springback of different degrees due to different flexibility to form a local negative pressure in the inner pipe 3, so that the residues in the filter piece 5 can be extracted out to improve the filter performance of the filter piece 5.

In the embodiment, the outer pipe 2 is in the shape of a cylinder, during specific implementation, the shape of the inner pipe 3 can be selected from a cube, a prism and the like to constitute an inner-layer container, and the inner cavity of the outer pipe 2 is correspondingly changed to match with the inner pipe so as to constitute an outer-layer container to accommodate the inner-layer container. The shape of the outer pipe 2 is not limited by the shape of the inner pipe 3, as long as the strength of the inner cavity wall is guaranteed to provide an adequate supporting force for the inner pipe 3. When the shape of the inner pipe 3 is changed, the shapes of the separation pieces 4-2 also need to be adaptively changed.

Due to different properties of different drugs, the curative effects of the drugs are affected after the drugs are mixed, and even harmful substances are produced; and the use of the disposable inner pipe 3 is conducive to avoiding the above phenomenon.

Through the support of the outer pipe 2, the thickness of the inner pipe 3 can be thinner, thereby being conductive to preparing the disposable inner pipe 3 and reducing the cost of the inner pipe 3. Of course, in a batch processing based environment, the inner pipe 3 can also be made of a stainless steel material.

During specific work, the raw materials are placed in the inner pipe 3, the inner pipe 3 is inserted into the outer pipe 2, and the cover body 1 is covered. The drug decocting container is connected with a liquid inlet pipeline through the liquid inlet on the cover body and is connected with the liquid outlet pipeline through the liquid outlet of the inner pipe 3 to perform a drug decocting operation. A counterbalance valve is serially connected to the liquid outlet pipeline, and the water pressure of the liquid outlet can be adjusted by adjusting the pressure of the counterbalance valve.

Other components of the drug decocting machine convey water at high-temperature (90° C. to 100° C.) and high-pressure (1.5-2.5 MPa) into the drug decocting container through the liquid inlet to extract effective ingredients in the raw materials, and the formed liquid medicine is discharged into a collection container from the liquid outlet pipeline.

Embodiment 1

Both the cover body 1 and the outer pipe 2 are made of stainless steel, and the inner pipe 3 is made of a polypropylene (PP) material. The inner pipe 3 has an inner diameter of 20 mm, a length of 350 mm and a wall thickness of 3 mm. 18 baffles are arranged in the inner pipe, 20 g 16-mesh scutellaria baicalensis decoction pieces are placed in the inner pipe 3, the inner pipe 3 is placed in the assorted outer pipe 2, the water inlet cover body 1 is pressed on the matched drug decocting machine, a drug decocting program is started, water of 100° C. and 1.9 MPa is input, 200 ml liquid medicine can be obtained within 2 minutes, and the detection result shows that the extraction rate of the effective ingredient baicalin is as high as 80.9%, which is much higher than the standards (the extraction rate of baicalin is 50%) of the conventional traditional Chinese medicine decocting machines.

Embodiment 2

The inner pipe 3 is made of stainless steel, has an inner diameter of 40 mm, a length of 100 mm and a wall thickness of 0.5 mm; and three baffles are arranged in the inner pipe.

30 g 16-mesh Shuanghuanglian formula decoction pieces (the prescription is from the Chinese Pharmacopoeia: 7.5 g scutellaria baicalensis, 15 g forsythia and 7.5 g honeysuckle) are placed in the inner pipe, the inner pipe is placed in the assorted outer pipe 2, the water inlet cover body 1 is pressed on the matched drug decocting machine, a drug decocting program is started, water of 100° C. and 1.9 MPa is input, 200 ml liquid medicine can be obtained within 3 minutes, and the detection result shows that the content of the effective ingredient baicalin is 591.7 mg (the standard in the pharmacopoeia is 200 mg), the content of forsythin is 49.2 mg (the standard in the pharmacopoeia is 6 mg), and the content of chlorogenic acid is 174.6 mg (the standard in the pharmacopoeia is 12 mg), and the drug decocting effect is 2.95-14.55 times as large as that of the national standard.

The beneficial effects of the present invention are as follows: water of 100° C. and 1.9 MPa is conveyed into the drug decocting container, fresh water is continuously conveyed, extracted liquid medicine continuously flows out to form gradient extraction, the larger the concentration difference is, the better the drug decocting effect is, and 200 ml liquid medicine can be obtained within 2-3 minutes. It can be seen from case data that the extraction rate of scutellaria baicalensis is as high as 80.9%, which is much higher than the standards (the extraction rate of baicalin is 50%) of the conventional traditional Chinese medicine decocting machines; and the drug decocting effect of the formula decoction piece Shuanghuanglian is also much higher than the requirements of the Chinese Pharmacopoeia, and the related content is 2.95-14.55 times as large as the standard in the Chinese Pharmacopoeia. The inner pipe of the drug decocting container is provided with baffles, thereby solving the problem that the pressure will firmly press and accumulate the decoction pieces at the outlet end during high-pressure extraction of ordinary long pipes, resulting in blockage, preventing the smooth flow of the liquid medicine and even generating dangers, and thus the advantages are very obvious. In addition, the inner pipes are divided into disposable ones and reusable ones, the disposable inner pipe is generally made of the polypropylene (PP) material, which is convenient, fast and hygienic; and the reusable inner pipe is generally made of the stainless steel material, a patient can feed a traditional Chinese medicine formula by himself after taking back the traditional Chinese medicine formula from the pharmacy for decocting the drugs, and thus the cost is reduced.

The above examples are merely illustrative of the present invention, and there are a number of different embodiments, these embodiments can be contemplated by those skilled in the art after comprehending the idea of the present invention, and thus will not be listed herein one by one.

The invention claimed is:

1. A drug decocting container, comprising:
   a cover body, an inner-layer container and an outer-layer container;
   wherein the inner-layer container comprises an inlet and an outlet and is configured to be inserted in the outer-layer container;
   wherein the outer-layer container comprises a wall thickness that is greater than a wall thickness of the inner-layer container and is configured to support the inner-layer container and control the deformation of the inner-layer container;
   wherein the cover body is configured to seal hermetically a top end of the inner-layer container; and
   wherein a liquid is configured to enter the inner-layer container via the inlet and exit the inner-layer container via the outlet and there is no liquid transfer between the inner-layer container and the outer-layer container.

2. The drug decocting container of claim 1, wherein the inlet is formed in the cover body, and the outlet is formed in a bottom end of the inner-layer container and wherein the bottom end is opposite to the top end.

3. The drug decocting container of claim 1, wherein the inner-layer container is tubular; and wherein an inner cavity of the outer-layer container comprises a cylindrical shape that matches with the inner-layer container's shape.

4. The drug decocting container of claim 1, wherein the wall thickness of the inner-layer container is in a range of 0.1-5 mm.

5. The drug decocting container of claim 1, wherein the inner-layer container is made of a polypropylene (PP) material.

6. The drug decocting container of claim 1, wherein the outer-layer container is tubular and is made of a stainless steel material, and the wall thickness is 5-30 mm.

7. The drug decocting container of claim 1, wherein a filter piece is arranged at the outlet in the inner-layer container.

8. The drug decocting container of claim 1, wherein a baffle is arranged in the inner-layer container, and the baffle is composed of multiple layers of separation pieces and a supporting rod; and the separation pieces are vertical to the axis of the supporting rod.

9. The drug decocting container of claim 8, wherein the layers of baffles of the layered baffle are connected by the supporting rod and are uniformly distributed along the circumferential direction of the supporting rod.

10. The drug decocting container of claim 1 further comprising a counterbalance valve arranged in a liquid outlet pipeline that is connected to the outlet.

* * * * *